United States Patent
Noh et al.

(10) Patent No.: US 10,521,156 B2
(45) Date of Patent: Dec. 31, 2019

(54) APPARATUS AND METHOD OF MANAGING MULTI SOLID STATE DISK SYSTEM

(71) Applicant: UNIST (ULSAN NATIONAL INSTITUTE OF SCIENCE AND TECHNOLOGY), Ulsan (KR)

(72) Inventors: Sam H Noh, Ulsan (KR); Byungsuck Kim, Ulsan (KR); Jaeho Kim, Ulsan (KR); KwangHyun Lim, Ulsan (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 106 days.

(21) Appl. No.: 15/868,523

(22) Filed: Jan. 11, 2018

(65) Prior Publication Data
US 2019/0212945 A1    Jul. 11, 2019

(51) Int. Cl.
*G06F 3/06* (2006.01)
*G06F 9/455* (2018.01)
*G06F 12/08* (2016.01)

(52) U.S. Cl.
CPC ............ *G06F 3/0659* (2013.01); *G06F 3/061* (2013.01); *G06F 3/0604* (2013.01); *G06F 3/064* (2013.01); *G06F 3/065* (2013.01); *G06F 3/0647* (2013.01); *G06F 3/0652* (2013.01); *G06F 3/0688* (2013.01); *G06F 9/455* (2013.01); *G06F 9/45558* (2013.01); *G06F 12/08* (2013.01); *G06F 2009/45579* (2013.01)

(58) Field of Classification Search
CPC ...... G06F 3/0604; G06F 3/065; G06F 3/0652; G06F 3/0688; G06F 2212/214
See application file for complete search history.

(56) References Cited

U.S. PATENT DOCUMENTS

| | | | |
|---|---|---|---|
| 2012/0246443 A1* | 9/2012 | Meir | G06F 12/06 711/209 |
| 2015/0186255 A1* | 7/2015 | Petculescu | G06F 12/0871 711/165 |
| 2017/0123666 A1* | 5/2017 | Sinclair | G06F 3/0604 |
| 2018/0129453 A1* | 5/2018 | Kim | G06F 3/061 |

OTHER PUBLICATIONS

Byungseok Kim et al.: Design and Implementation of SSD Array Manager for Stable Performance in Cloud Computing Systems, Feb. 2016.
Byungseok Kim et al.: Design of managing mechanism for stable performance in multi SSD environment, Ulsan National Institute of Science Technology, Jun. 2016.

* cited by examiner

*Primary Examiner* — Masud K Khan
(74) *Attorney, Agent, or Firm* — EIP US LLP

(57) ABSTRACT

A management apparatus of a multi-solid state disk (SSD) system implemented by a computer is provided. The management apparatus of the multi-SSD system may include a first SSD group including a plurality of SSDs arranged in rows or columns and configured to execute a received write command using segments in the plurality of SSDs, a second SSD group including a plurality of SSDs arranged in rows or columns and configured to execute a read command for valid data in the plurality of SSDs, and a manager configured to copy a valid page in the second SSD group while a write command for the first SSD group being executed and to erase all data in the second SSD group when the copying is completed.

7 Claims, 8 Drawing Sheets

APPARATUS AND METHOD OF MANAGING MULTI SOLID STATE DISK SYSTEM

TECHNICAL FIELD

The following description relates to a solid state disk (SSD) system management method, and more particularly, to a management method for a multi-SSD system including a plurality of flash-based SSDs.

BACKGROUND ART

A flash memory-based solid state disk (SSD) is implemented using a semiconductor memory device, and accordingly it is possible to access data at a very high speed in comparison to a hard disk. With the development of SSD-related technologies of manufacturers, SSDs are being used in various fields, such as cloud computing systems or file systems, today due to durability and stability of SSDs.

However, since overwriting is not possible due to characteristics of materials in flash memories that are the base of SSDs, writing needs to be performed after input data is erased. Due to the above issue, it is impossible to maintain constant performances of SSDs.

According to a related art, a scheme of isolating internal resources managed by an SSD for each virtual machine (VM) has been used. However, in the related art, when pages of different VMs are included in a block of the SSD, and even when a garbage collection (GC) is caused by a specific VM, a time is required to manage pages of the other VMs.

DISCLOSURE OF THE INVENTION

Technical Solutions

Example embodiments provide a management method and apparatus to provide a reliable performance in a multi-solid state disk (SSD) system. Some aspects which are illustrative but are not limited will be described below.

According to an aspect, there is provided a management apparatus of a multi-SSD system implemented by a computer and including at least one processor. The management apparatus of the multi-SSD system may include a first SSD group including a plurality of SSDs arranged in rows or columns and configured to execute a received write command using segments in the plurality of SSDs, a second SSD group including a plurality of SSDs arranged in rows or columns and configured to execute a read command for valid data in the plurality of SSDs, and a manager configured to copy a valid page in the second SSD group while a write command for the first SSD group being executed and to erase all data in the second SSD group when the copying is completed.

The first SSD group may be configured to execute the write command using segments that are sequentially arranged in the plurality of SSDs.

When writing to a last segment in the first SSD group is completed, the manager may be configured to move a writing pointer to the second SSD group to execute the write command.

The management apparatus may further include a third SSD group to which a valid page included in the second SSD group is copied.

The manager may be configured to determine a number of SSD groups in the SSD system based on an elapsed time of writing to a single segment, an elapsed time of reading to the single segment, an elapsed time of erasing to the single segment, and a ratio of valid pages in the single segment, and configured to manage each of the SSD groups based on the determined number.

The manager may be configured to determine a number n of SSD groups in the SSD system using Expression 1. Expression 1 may be $$\frac{t_{C_{SEG}}}{t_{W_{SEG}}} \cdot \frac{1}{1-u} + \left(\frac{t_{R_{SEG}}}{t_{W_{SEG}}} + 1\right) \cdot \frac{u}{1-u} + 1 \le n$$

in which $t_{W_{SEG}}$ denotes the elapsed time of writing to the single segment, $t_{R_{SEG}}$ denotes the elapsed time of reading to the single segment, $t_{C_{SEG}}$ denotes the elapsed time of erasing to the single segment, and u denotes the ratio of the valid pages in the single segment.

According to another aspect, there is provided a method of managing an SSD system performed by a computer. The method may include executing a received write command using segments in a first SSD group that includes a plurality of SSDs arranged in rows or columns, executing a read command for valid data in a second SSD group that includes a plurality of SSDs arranged in rows or columns, copying a valid page in the second SSD group while a write command for the first SSD group being executed, and erasing all data in the second SSD group when the copying is completed.

The executing of the write command may include executing the write command using segments that are sequentially arranged in the plurality of SSDs.

The method may further include, when writing to a last segment in the first SSD group is completed, moving a writing pointer to the second SSD group to execute the write command.

The method may further include determining a number of SSD groups in the SSD system based on an elapsed time of writing to a single segment, an elapsed time of reading to the single segment, an elapsed time of erasing to the single segment, and a ratio of valid pages in the single segment.

The determining of the number of SSD groups may include determining a number n of SSD groups in the SSD system using Expression 1. Expression 1 may be $$\frac{t_{C_{SEG}}}{t_{W_{SEG}}} \cdot \frac{1}{1-u} + \left(\frac{t_{R_{SEG}}}{t_{W_{SEG}}} + 1\right) \cdot \frac{u}{1-u} + 1 \le n$$

in which $t_{W_{SEG}}$ denotes the elapsed time of writing to the single segment, $t_{R_{SEG}}$ denotes the elapsed time of reading to the single segment $t_{C_{SEG}}$ denotes the elapsed time of erasing to the single segment, and u denotes the ratio of the valid pages in the single segment.

DETAILED DESCRIPTION FOR CARRYING OUT THE INVENTION

The following structural or functional descriptions of example embodiments disclosed in the present disclosure are merely intended for the purpose of describing the example embodiments and the example embodiments may be implemented in various forms. The example embodiments are not meant to be limited, but it is intended that various modifications, equivalents, and alternatives are also covered within the scope of the claims Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, example embodiments will be described in detail with reference to the accompanying drawings, and like reference numerals in the drawings refer to like elements throughout.

In the following description, a garbage collection (GC) may refer to a process of erasing, as invalid data, existing data overwritten to a different address by an out-of-place-update scheme among data stored in a specific solid state disk (SSD). In example embodiments, mapping data associated with valid data and invalid data of a specific SSD may be stored by a kernel associated with a plurality of SSDs. Also, when copying of valid data of a specific SSD is completed, the kernel may transmit a trim command to the specific SSD and may support an external GC. The external GC will be further described below with reference to the accompanying drawings.

Figure 1:
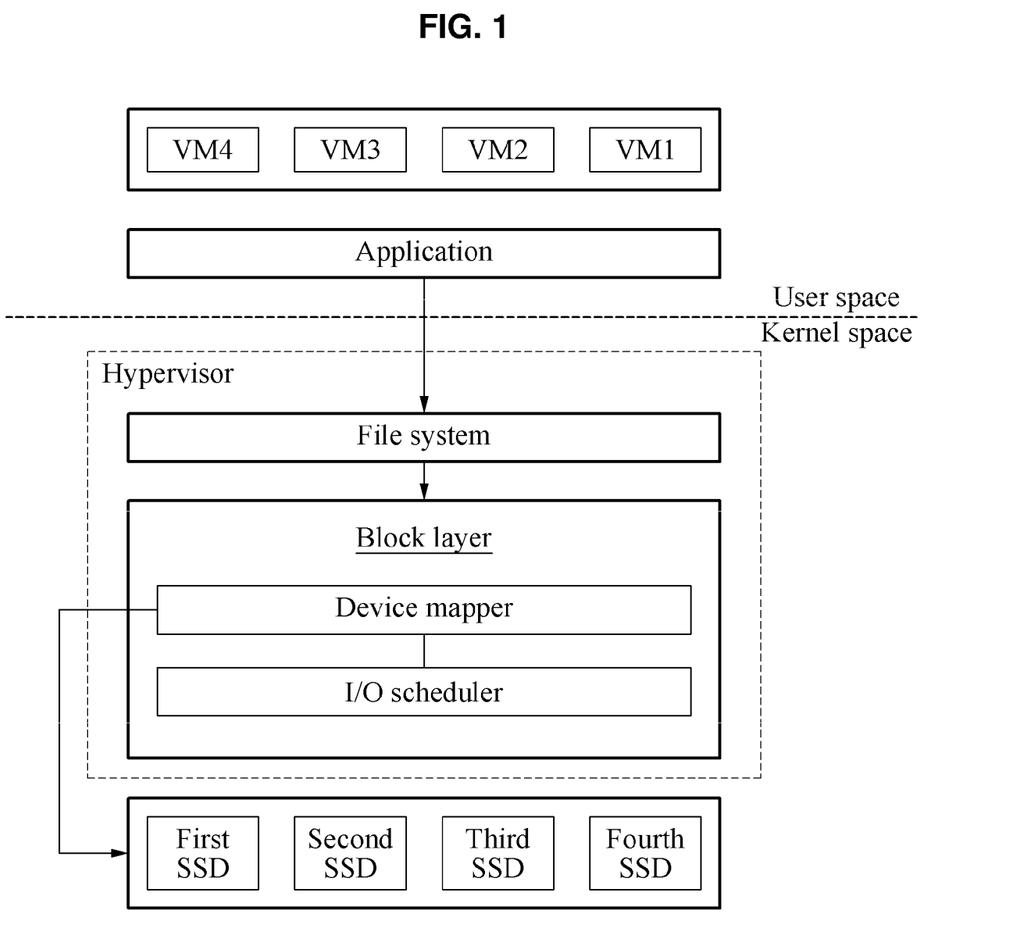
FIG. 1 is a diagram illustrating a structure of a solid state disk (SSD) array manager according to an example embodiment.

FIG. 1 is a diagram illustrating a structure of an SSD array manager according to an example embodiment. FIG. 1 illustrates a file system and a block layer included in a kernel space. Also, FIG. 1 illustrates a plurality of virtual machines (VMs) used by a user and an application executed by the VMs in a user space.

The block layer may include a device mapper and an input/output (I/O) scheduler. For example, the device mapper may be a development platform for a disk volume management provided by a kernel. Also, the device mapper may generate a plurality of devices as virtual storages or virtual block devices. The device mapper may define a mapping scheme between an actual device and a generated virtual storage or virtual block device. A management apparatus for managing a multi-SSD system according to an example embodiment may be implemented by the device mapper.

The device mapper may be used as, for example, a Linux logical volume manager (LVM). The LVM may include a physical volume (PV) indicating a physical device, a volume group (VG) implemented as a set of PVs, and a logical volume (LV) to which a management method is applied based on a preset volume in the VG. The management apparatus for managing a multi-SSD system may be implemented as a management module of the LVM in a device mapper layer.

Figure 2A:
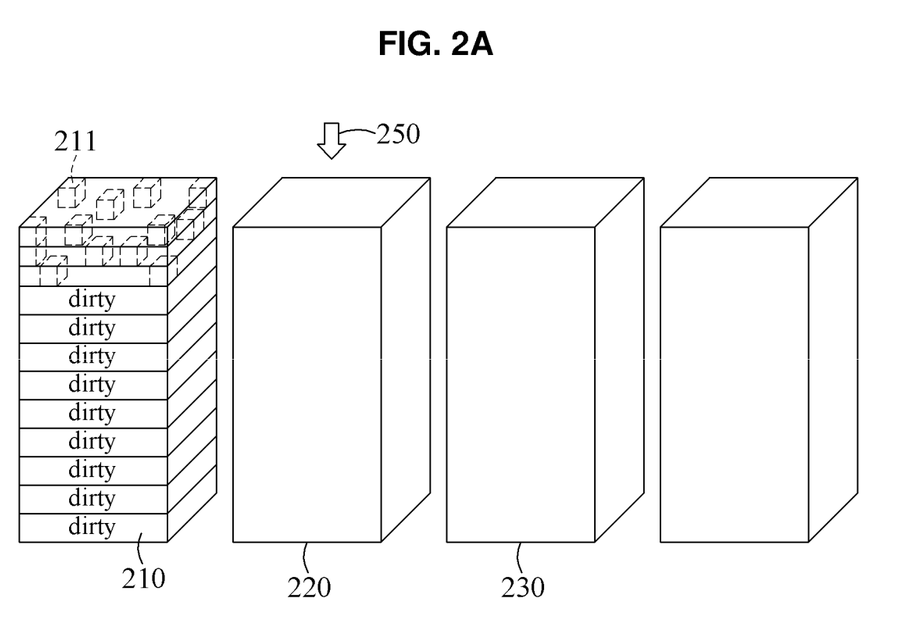
FIG. 2A is a diagram illustrating an initial process in which an external garbage collection (GC) is performed using a plurality of SSDs according to an example embodiment.

FIG. 2A is a diagram illustrating an initial process in which an external GC is performed using a plurality of SSDs according to an example embodiment. FIG. 2A illustrates a plurality of SSDs, for example, a first SSD 210, a second SSD 220 and a third SSD 230, included in a multi-SSD system. Although four SSDs are included in the multi-SSD system as shown in FIG. 2A, this is merely an example to facilitate understanding of the present disclosure and should not be understood as being limited a scope of example embodiments. For example, the present inventive concept may be applicable to various modified embodiments such as a multi-SSD system including "40" SSDs or a multi-SSD system including "400" SSDs.

The multi-SSD system may be a system in which SSDs are connected via physically separate interfaces. Thus, in the multi-SSD system, an effect that an operation performed in one SSD does not have an influence on a bandwidth of another SSD may be expected.

For example, writing to the first SSD 210 may be performed. In this example, a management apparatus of the multi-SSD system may perform writing to a block included in the first SSD 210 based on a preset rule. The management apparatus of the multi-SSD system may be implemented in a form of a module between a file system and a device driver in a kernel layer.

The management apparatus of the multi-SSD system may perform writing to the first SSD 210 in a log-structured manner. Accordingly, writing may be performed in an order of blocks included in the first SSD 210, that is, from a first block to a last block in the first SSD 210, independently of a requested writing block. When writing to the last block of the first SSD 210 is completed, the management apparatus of the multi-SSD system may move a writing block pointer 250 to the second SSD 220.

For example, a request to overwrite first data input to the first block of the first SSD 210 may be sent, however, the example is not limited. In this example, the management apparatus of the multi-SSD system may perform writing of new data, for example, second data corresponding to the first data to a second block of the first SSD 210, using the above-described out-of-place-update scheme. Also, the first data that was overwritten may become invalid data. The second data that is newly overwritten, or third data that has not been overwritten since the third data is first input may be managed as valid data 211.

When writing to a set block of the first SSD 210 is completed, the management apparatus of the multi-SSD system may select the third SSD 230 to copy the valid data 211 included in the first SSD 210. A process of copying valid data using the selected third SSD 230 and of performing a GC in the first SSD 210 will be further described below with reference to FIG. 2B.

Figure 2B:
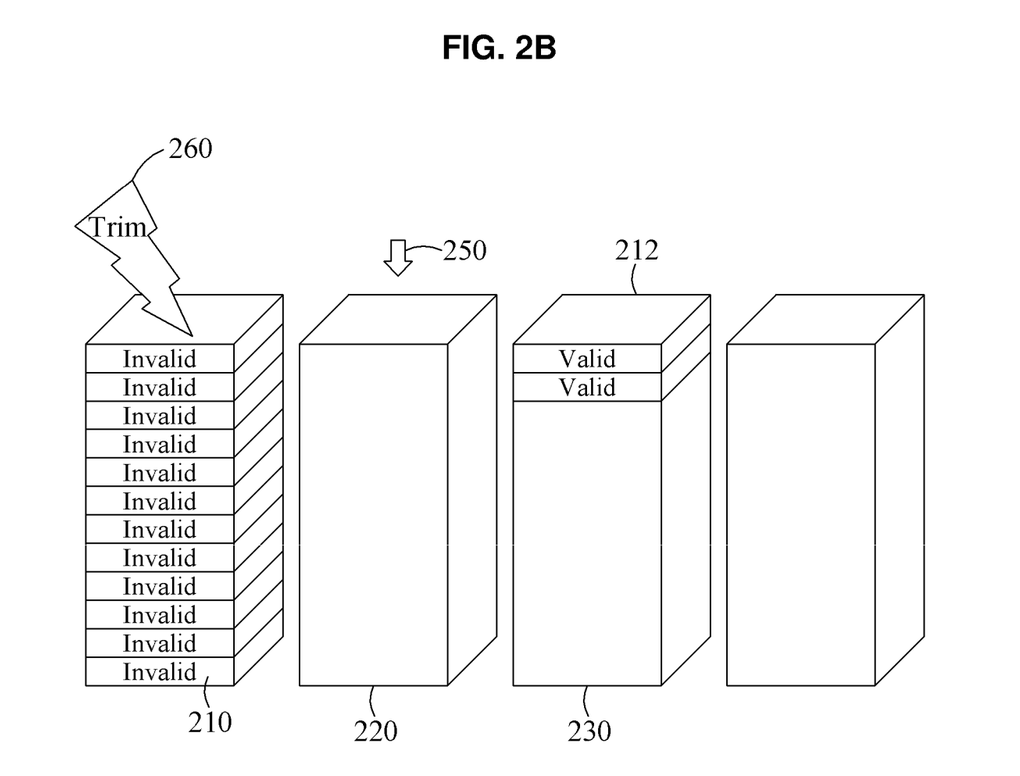
FIG. 2B is a diagram illustrating a process in which an external GC of a first SSD is completed.

FIG. 2B is a diagram illustrating a process in which an external GC of a first SSD is completed according to an example embodiment. FIG. 2B illustrates valid data 212 copied from a first SSD 210 to a third SSD 230. A management apparatus of a multi-SSD system according to an example embodiment may copy valid data 211 stored in a block included in the first SSD 210 to the third SSD 230. For example, the multi-SSD system may display invalid data of the first SSD 210 corresponding to overwriting, and may identify valid data and invalid data in association with blocks in the first SSD 210. Thus, the first SSD 210 may recognize data included in blocks included in the first SSD 210 as valid data and may not perform a separate GC.

A process of copying the valid data 211 of the first SSD 210 as the valid data 212 of the third SSD 230 may be performed when a writing block pointer 250 is moved from the first SSD 210 to the second SSD 220. Also, the third SSD 230 may be arbitrarily selected from SSDs other than the second SSD 220 to which the writing block pointer 250 is moved, in the multi-SSD system.

When copying of all the valid data 211 of the first SSD 210 to the third SSD 230 is completed, the management apparatus of the multi-SSD system may store metadata that determines original data remaining in the first SSD 210 as invalid data. Also, the management apparatus of the multi-SSD system may map valid data 212 newly stored in the third SSD 230 to metadata in a file system.

The management apparatus of the multi-SSD system may transmit a trim command 260 to the first SSD 210. Based on the trim command 260 transmitted to the first SSD 210, it is possible to remove data in all blocks and return to a stable state.

An external GC process according to an example embodiment may equally be applied to a writing process of the second SSD 220 to which the writing block pointer 250 is moved. Writing may be performed in an order of all blocks included in the second SSD 220, that is, from a first block to a last block, and the writing block pointer 250 may also be sequentially moved. When writing to the last block of the second SSD 220 is performed, the management apparatus of the multi-SSD system may arbitrarily select a new SSD to copy valid data stored in the second SSD 220 from the multi-SSD system.

The management apparatus of the multi-SSD system may manage invalid data information associated with a specific SSD using an array manager included in a kernel space. However, the management apparatus of the multi-SSD system may not intentionally transfer mapping information associated with invalid data to the specific SSD. Accordingly, the specific SSD may continue to perform a write operation instead of performing a GC, and an effect of preventing a degradation in a performance and a bandwidth fluctuation due to a GC may be expected.

Figure 3:
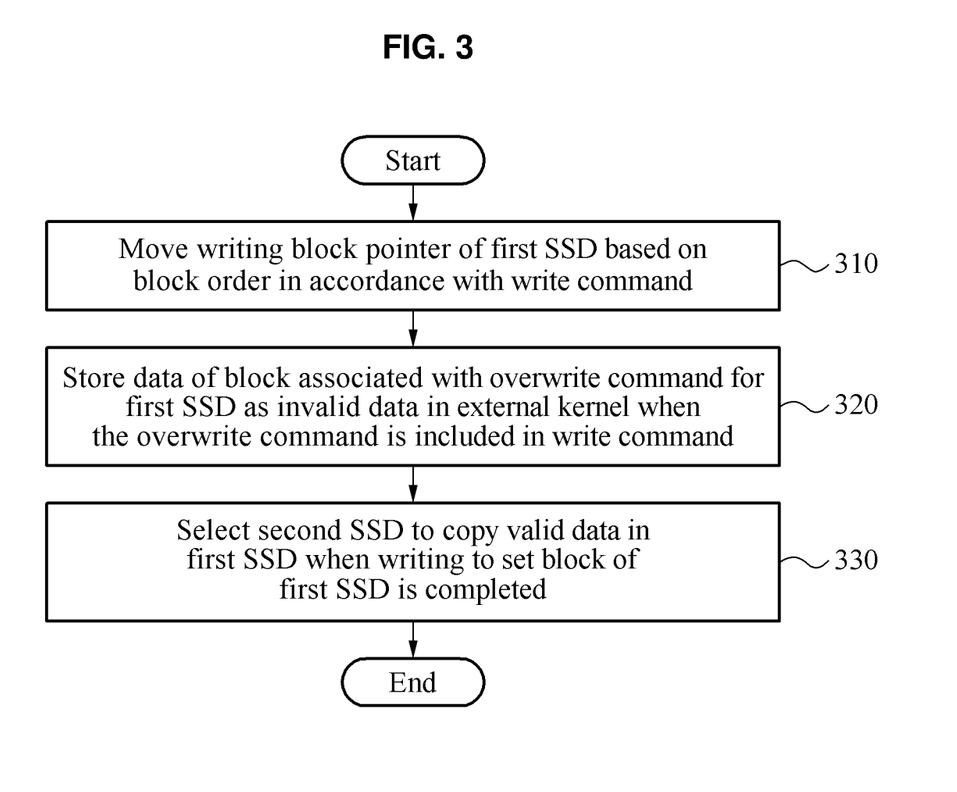
FIG. 3 is a flowchart illustrating a method of managing a multi-SSD system according to an example embodiment.

FIG. 3 is a flowchart illustrating a method of managing a multi-SSD system according to an example embodiment. FIG. 3 illustrates an example of a method of managing a multi-SSD system. The method of managing the multi-SSD system may include operation 310 of moving a writing block pointer of a first SSD based on a block order in accordance with a write command, operation 320 of storing data of a block associated with an overwrite command for the first SSD as invalid data in an external kernel when the overwrite command is included in the write command, and operation 330 of selecting a second SSD to copy valid data in the first SSD when writing to a set block of the first SSD is completed. The method of managing the multi-SSD system may be performed by a management apparatus of the multi-SSD system that includes at least one processor and that is at least temporarily implemented by the at least one processor.

In operation 310, the management apparatus of the multi-SSD system may move the writing block pointer of the first SSD based on the block order. The first SSD may be an SSD in which a current write command is being executed among a plurality of SSDs included in the multi-SSD system. The management apparatus of the multi-SSD system may continue to assign writing and overwriting to a new block included in the first SSD based on an out-of-place-update scheme.

For example, the management apparatus of the multi-SSD system may perform writing in an order of blocks included in the first SSD, that is, from a first block to a last block. The first block may be a block corresponding to an address "0" in the first SSD, and a physical location of the first block in the first SSD may variously change. The management apparatus of the multi-SSD system may move the writing block pointer based on an executed write command.

In operation 320, when the overwrite command for the first SSD is included in the write command, the management apparatus of the multi-SSD system may store metadata that determines the data of the block associated with the overwrite command as invalid data in the external kernel. For example, when data changes, the management apparatus of the multi-SSD system may store invalid data in a form of metadata in the external kernel, and may not provide a notification to the first SSD. Accordingly, even when updating of data by the overwrite command continues to be performed, all data may be determined as valid data in the first SSD, and accordingly writing may continue to be performed. The first SSD may not perform a GC until the management apparatus of the multi-SSD system intentionally creates an invalid page in the first SSD, and thus it is possible to expect an effect of preventing a fluctuation of a performance due to the GC.

In operation 330, the management apparatus of the multi-SSD system may recognize the first SSD as a GC SSD when the writing of the set block of the first SSD is completed. The set block may be, for example, a block corresponding to a last address in the first SSD. In the following description, the GC SSD may refer to an SSD in which data needs to be managed by performing an external GC after writing to all blocks is completed. To prevent a GC from being performed in an SSD, the management apparatus of the multi-SSD system may perform a GC using another SSD.

In operation 330, the management apparatus of the multi-SSD system may select the second SSD to copy valid data in the first SSD. The management apparatus of the multi-SSD system may recognize the second SSD as a target SSD. In the following description, a target SSD may refer to an SSD to which valid data of the first SSD is to be copied so as to perform an external GC of the first SSD when the first SSD is full. A process of copying valid data to the second SSD and of executing a trim command for the first SSD will be further described below with reference to FIG. 5.

Figure 4:
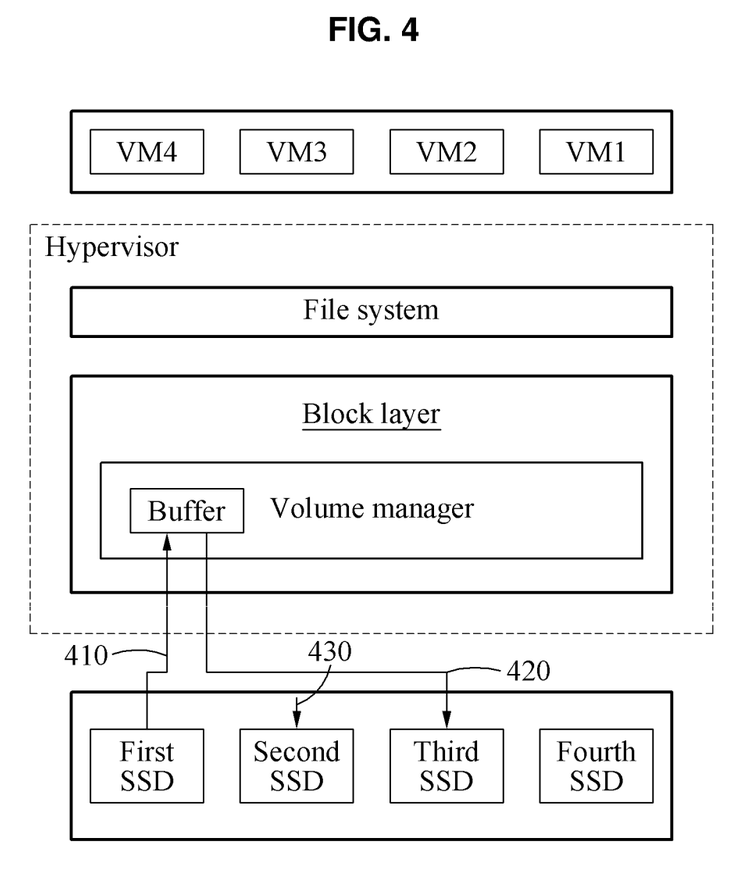
FIG. 4 is a diagram illustrating an example of a process of using a host buffer when an external GC is performed according to an example embodiment.

FIG. 4 is a diagram illustrating an example of a process of using a host buffer when an external GC is performed according to an example embodiment. FIG. 4 illustrates a configuration of a volume manager and a buffer included in a block layer in kernel software. A management apparatus of a multi-SSD system according to an example embodiment may be implemented by a device mapper configured to manage a disk volume. The management apparatus of the multi-SSD system may be implemented in a form of a utility, may generate new block devices and may call a management scheme thereof based on a name of a factor. The management apparatus of the multi-SSD system may include the management scheme in a form of a kernel module, and may load the management scheme when the management scheme is called.

Based on the mapping algorithm, the management apparatus of the multi-SSD system may allow a writing block pointer 430 to be located in a specific SSD. Also, the management apparatus of the multi-SSD system may execute a write command while moving the writing block pointer 430. When writing is performed up to a last sector in a specific SSD, the management apparatus of the multi-SSD system may record a state of the specific SSD as a state in which an external GC is required, and may continue to perform writing to a next SSD.

When the external GC is performed, the management apparatus of the multi-SSD system may allow valid data to be read by a buffer included in a kernel through process 410. Also, the management apparatus of the multi-SSD system may allow writing to a second SSD to be performed in the buffer in the kernel through process 420, to perform an external GC.

Figure 5:
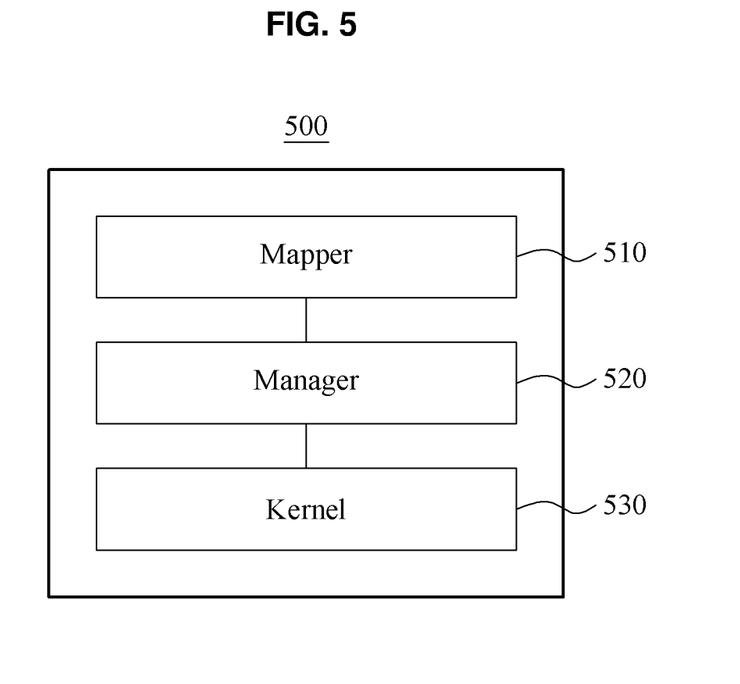
FIG. 5 is a block diagram illustrating a management apparatus of a multi-SSD system according to an example embodiment.

FIG. 5 is a block diagram illustrating a management apparatus of a multi-SSD system according to an example embodiment. Referring to FIG. 5, a management apparatus 500 of a multi-SSD system may include a mapper 510, a manager 520 and a kernel 530. The management apparatus 500 of the multi-SSD system may include at least one processor, and may be at least temporarily implemented by the at least one processor.

The mapper 510 may move a writing block pointer located in a first SSD based on a block order in accordance with a write command. For example, the mapper 510 may move the writing block pointer in an order from a first block to a last block in the first SSD.

When writing to a set block of the first SSD is completed, the manager 520 may select a second SSD to copy valid data stored in the first SSD. When writing to the last block of the first SSD is completed, the manager 520 may select a third SSD to continue to execute a write command. The second SSD may be an SSD different from the third SSD in which a new write operation is to be performed, and may be referred to as a target SSD to which valid data of the first SSD is to be moved. The mapper 510 may allow the write command to be continuously executed while moving a writing block pointer of the third SSD that is newly selected based on a block order in accordance with a write command.

The kernel 530 may display data of a block associated with an overwrite command for the first SSD as invalid data and may store the data as mapping data, when the overwrite command is included in the write command. When the second SSD is selected based on the stored mapping data, the kernel 530 may copy valid data in the first SSD to the second SSD. When all valid data in the first SSD are copied, the kernel 530 may transmit a trim command to the first SSD and may remove all data corresponding to all blocks included in the first SSD. In the present disclosure, the trim command may refer to a command to inform each SSD of data that is processed to be invalid in a file system. To maintain a performance of an entire system by preventing a GC in an SSD, valid data may be copied in advance by the kernel 530 outside an SSD and a trim command for all data may be transferred.

Figure 6:
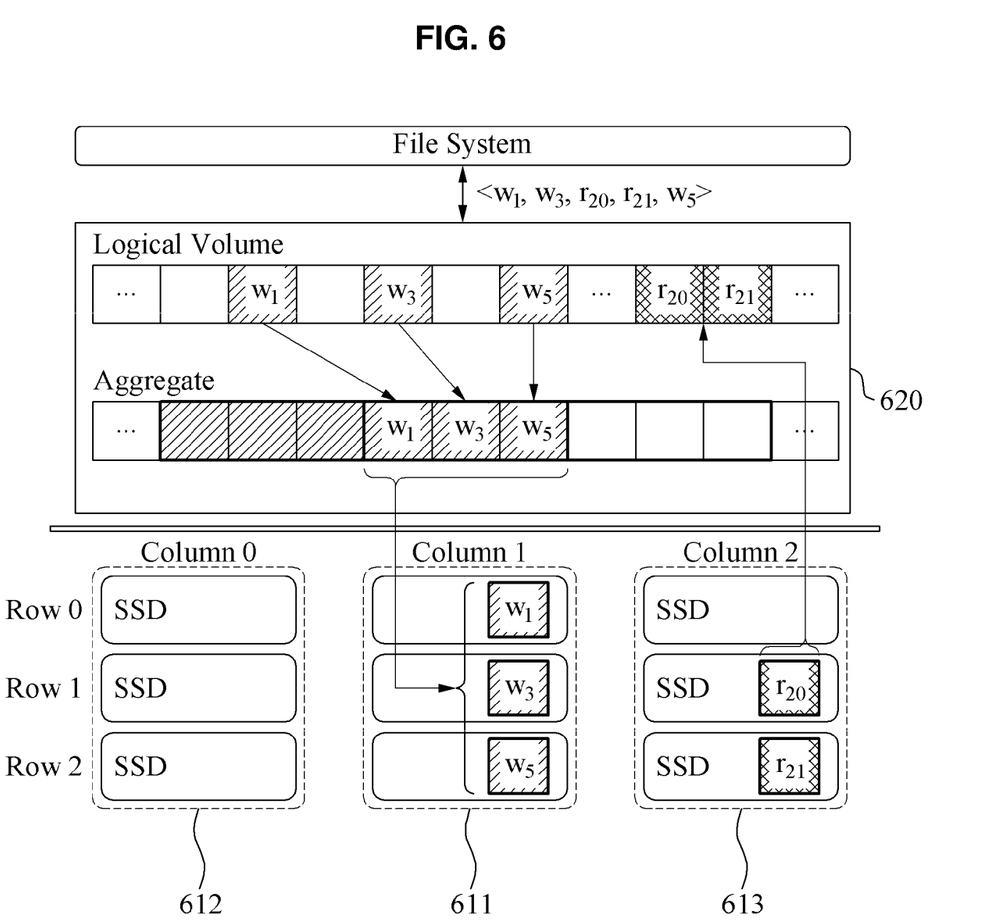
FIG. 6 is a diagram illustrating a management apparatus of an SSD system according to an example embodiment.

FIG. 6 is a diagram illustrating a management apparatus of an SSD system according to an example embodiment. FIG. 6 illustrates an example of a structure of a management apparatus of an SSD system. The SSD system may include a plurality of SSD groups, for example, a first SSD group 611 and second SSD groups 612 and 613. Each of the first SSD group 611 and second SSD groups 612 and 613 may include a plurality of SSDs arranged in rows or columns. The first SSD group 611 and the second SSD groups 612 and 613 are separate from each other based on columns, for example, column 0, column 1 and column 2, however, this is merely an example to facilitate understanding. For example, an example in which a plurality of SSD groups are separate based on rows, for example, row 0, row 1 and row 2, may also be within a scope of the present disclosure. Also, a plurality of SSDs included in each of the first SSD group 611 and the second SSD groups 612 and 613 may include segments separated by a fixed size. For example, a segment may be set as a size corresponding to a multiple of N of a basic unit in which an erase command for an SSD is executed, however, is not limited thereto. In this example, N may be a natural number.

The SSD system may execute a write command and a read command for data using the plurality of SSD groups arranged in rows or columns, and may perform a GC as a single SSD group unit. Thus, the SSD system may perform a GC independently of a write command, to enhance a performance of an entire system. Also, the SSD system may have an effect of providing a data recovery function in response to an emergency situation such as a hardware error or a power error.

The first SSD group 611 may execute write commands $w_1$, $w_3$ and $w_5$ received from a manager 620 using segments in a plurality of SSDs. For example, the first SSD group 611 may execute write commands in a log-structured manner using segments that are sequentially arranged in the plurality of SSDs. The log-structured manner may refer to a manner in which new data associated with a write command is sequentially appended based on an order of segments. The first SSD group 611 may be a front-end pool to provide free space in which new data is to be written based on a received write command.

The second SSD groups 612 and 613 may execute read commands $r_{20}$ and $r_{21}$ received from the manager 620. Also, one of the second SSD groups 612 and 613 may perform a GC to create a new front-end pool. In an example, one of the second SSD groups 612 and 613 may be sequentially selected based on an index order assigned to each of SSD groups. In another example, one of the second SSD groups 612 and 613 may be selected as an SSD group with greatest free space based on a specific point in time at which a GC is to be performed. Thus, a write command may not be transferred to a plurality of SSDs included in the second SSD groups 612 and 613. The second SSD groups 612 and 613 may be back-end pools to execute received read commands and to perform a GC in preparation for a write command that is to be newly received.

The manager 620 may copy valid pages of the second SSD group 613 that is one of the second SSD groups 612 and 613, while the write command for the first SSD group 611 being executed. In an example, the manager 620 may perform an intra-column GC to copy valid pages of the second SSD group 613 back to the second SSD group 613. In another example, the manager 620 may perform an inter-column GC to copy the valid pages of the second SSD group 613 to the second SSD group 612 that is the other of the second SSD groups 612 and 613. Also, the manager 620 may perform a GC using a scheme of erasing all data in the second SSD group 613 selected after copying of the valid pages is completed.

For example, the manager 620 may be implemented as a part of a Linux kernel included in an I/O layer. The manager 620 may be implemented as a logical volume manager. When writing to a last segment of the first SSD group 611 is completed, the manager 620 may move a writing pointer to the selected second SSD group 613, to execute a write command. The selected second SSD group 613 may include a plurality of SSDs in which free space is secured by performing a GC in advance independently of the write command. Based on the above configuration, the SSD system may provide an effect of decoupling a GC process from a write command and a read command for an SSD, to further enhance a speed performance of the SSD system. For example, the manager 620 may perform a GC using a scheme of transmitting a trim command in advance to the selected second SSD group 613.

Figure 7:
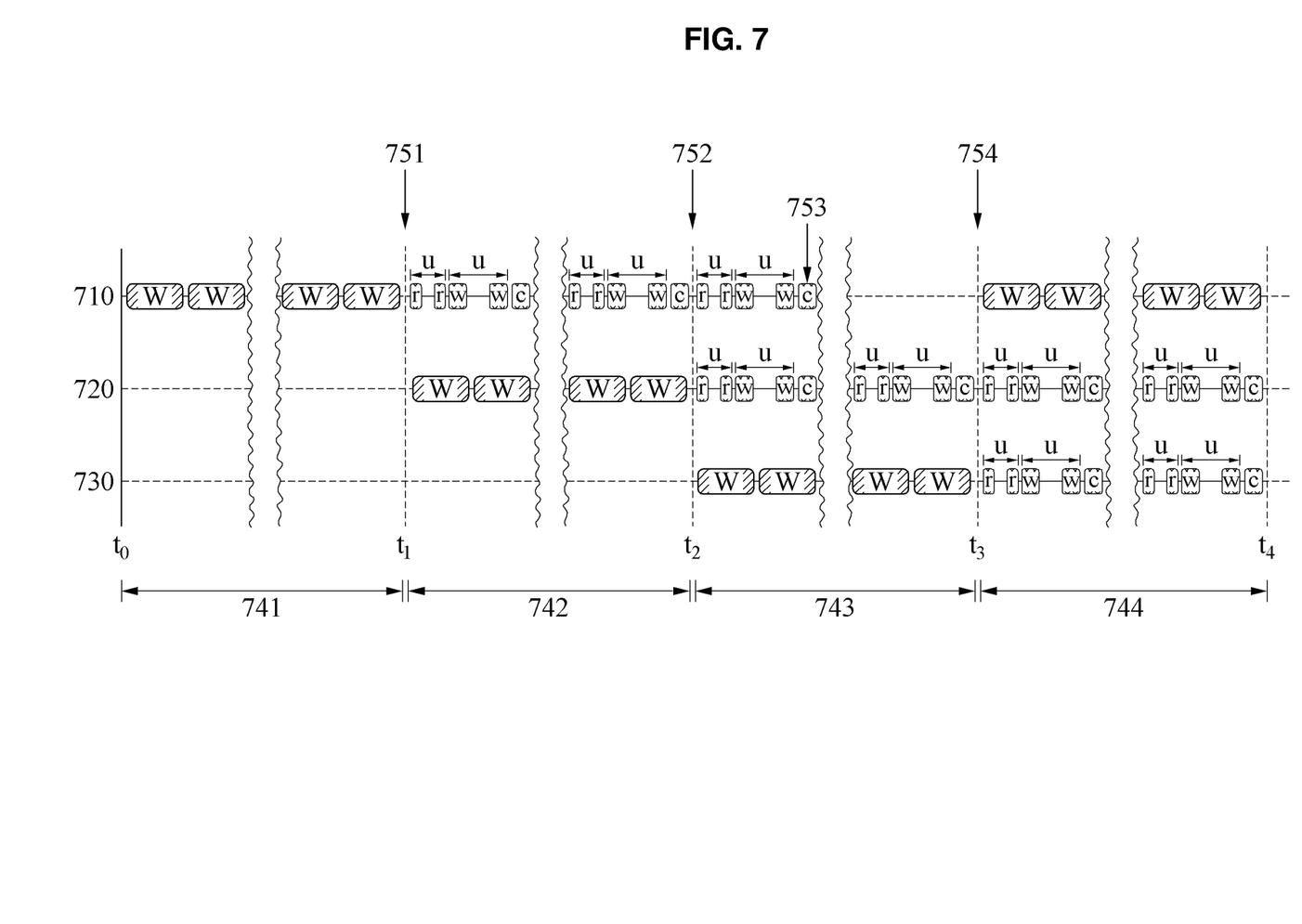
FIG. 7 is a diagram illustrating an example of a process in which the management apparatus of the SSD system of FIG. 6 performs a GC.

FIG. 7 is a diagram illustrating an example of a process in which the management apparatus of the SSD system of FIG. 6 performs a GC. Grouping a plurality of SSDs in the SSD system based on rows or columns may be a significant factor to determine a performance. Hereinafter, a process of determining a number of SSD groups to optimize a performance of an SSD system will be further described.

FIG. 7 illustrates operations performed by three SSD groups, for example, a first SSD group 710, a second SSD group 720 and a third SSD group 730, over time. Each of the three SSD groups may include a single SSD. For example, the first SSD group 710 may be set as a front-end pool to execute a write command received from a manger. Also, the other two SSD groups, that is, the second SSD group 720 and the third SSD group 730 may be back-end pools to execute read commands received from an application server.

In FIG. 7, W may represent an elapsed time of writing to a single segment. Also, in FIG. 7, r may represent an elapsed time of reading to a single segment, and C may represent an elapsed time of erasing to a single segment.

The first SSD group 710 may sequentially execute write commands based on space of segments. For example, the first SSD group 710 may perform writing to segments included in an SSD during a first time interval 741 (from $t_0$ to $t_1$) designated as a front-end pool. However, when a first event 751 in which space of segments in the first SSD group 710 is full occurs, the manager may set the second SSD group 720 as a new front-end pool. Similarly, the second SSD group 720 may execute a write command for segments included in an SSD during a second time interval 742 (from $t_1$ to $t_2$) designated as a front-end pool.

When a second event 752 in which space of segments in the second SSD group 720 is full occurs, the manager may set the third SSD group 730 as a new front-end pool. Similarly, the third SSD group 730 may execute a write command for segments included in an SSD during a third time interval 743 (from $t_2$ to $t_3$) designated as a front-end pool.

The first SSD group 710 in which all segments are full may be newly set as a back-end pool to execute a read command and perform a GC. The manager may perform a GC of the first SSD group 710. For example, the manager may perform a read operation on a segment including a valid page among segments in the first SSD group 710, may copy read data to a new SSD group, and may execute a write command. In this example, the manager may perform an erase operation on each of the segments in the first SSD group 710, to perform a GC of the first SSD group 710. When the erase operation on all the segments in the first SSD group 710 is completed, a third event 753 in which the GC of the first SSD group 710 is completed may occur. In this example, the first SSD group 710 may include all segments with a completely free space, and may wait for a write command until the first SSD group 710 is designated as a new front-end pool by the manager.

When a fourth event 754 in which space of segments in the second SSD group 730 is full occurs, the manager may set the first SSD group 710 as a new front-end pool again. As described above, the first SSD group 710 may execute a write command for segments included in an SSD during a fourth time interval 744 (from $t_3$ to $t_4$) newly designated as a front-end pool.

The manager of the SSD system may determine a number of SSD groups in the SSD system based on an elapsed time of writing to a single segment, an elapsed time of reading to the single segment, an elapsed time of erasing to the single segment and a ratio of valid pages in the single segment, and may manage the SSD groups based on the determined number.

For example, the manager may determine a number n of SSD groups in the SSD system using Expression 1.

$$\frac{t_{C_{SEG}}}{t_{W_{SEG}}} \cdot \frac{1}{1-u} + \left(\frac{t_{R_{SEG}}}{t_{W_{SEG}}} + 1\right) \cdot \frac{u}{1-u} + 1 \le n \qquad \text{Expression 1}$$

In Expression 1, $t_{W_{SEG}}$ denotes the elapsed time of writing to the single segment, $t_{R_{SEG}}$ denotes the elapsed time of reading to the single segment, $t_{C_{SEG}}$ denotes the elapsed time of erasing to the single segment, and u denotes the ratio of the valid pages in the single segment.

The manager may determine the number n of SSD groups using Expression 1, so that a time interval in which a GC of a single SSD group in which segments are full in response to execution of a write command is performed may be less than or equal to a time interval in which write commands for the other SSD groups are executed.

The example embodiments described herein may be implemented using a hardware component, a software component and/or a combination thereof. An apparatus, a method and components described in the example embodiments may be implemented using one or more general-purpose or special purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A management apparatus of a solid state disk (SSD) system implemented by a computer, and comprising:
a first SSD group comprising a plurality of SSDs arranged in rows or columns and configured to execute a received write command using segments in the plurality of SSDs;
a second SSD group comprising a plurality of SSDs arranged in rows or columns and configured to execute a read command for valid data in the plurality of SSDs; and
a manager configured to copy a valid page in the second SSD group while a write command for the first SSD group being executed, and to erase all data in the second SSD group when the copying is completed, wherein the manager is configured to determine a number of SSD groups in the SSD system based on an elapsed time of writing to a single segment, an elapsed time of reading to the single segment, an elapsed time of erasing to the single segment, and a ratio of valid pages in the single segment, and is configured to manage each of the SSD groups based on the determined number, and wherein the manager is configured to determine a number n of SSD groups in the SSD system using Expression 1:

$$\frac{t_{C_{SEG}}}{t_{W_{SEG}}} \cdot \frac{1}{1-u} + \left(\frac{t_{R_{SEG}}}{t_{W_{SEG}}} + 1\right) \cdot \frac{u}{1-u} + 1 \leq n, \quad \text{[Expression 1]}$$

in which $t_{W_{SEG}}$ denotes the elapsed time of writing to the single segment, $t_{R_{SEG}}$ denotes the elapsed time of reading to the single segment, $t_{C_{SEG}}$ denotes the elapsed time of erasing to the single segment, and u denotes the ratio of the valid pages in the single segment.

2. The management apparatus of claim 1, wherein the first SSD group is configured to execute the write command using segments that are sequentially arranged in the plurality of SSDs.

3. The management apparatus of claim 1, wherein when writing to a last segment in the first SSD group is completed, the manager is configured to move a writing pointer to the second SSD group to execute the write command.

4. The management apparatus of claim 1, further comprising:
a third SSD group to which a valid page included in the second SSD group is copied.

5. A method of managing a solid state disk (SSD) system, the method performed by a computer and comprising:
executing a received write command using segments in a first SSD group, the first SSD group comprising a plurality of SSDs arranged in rows or columns;
executing a read command for valid data in a second SSD group, the second SSD group comprising a plurality of SSDs arranged in rows or columns;
copying a valid page in the second SSD group while a write command for the first SSD group being executed; and
erasing all data in the second SSD group when the copying is completed;
determining a number of SSD groups in the SSD system based on an elapsed time of writing to a single segment, an elapsed time of reading to the single segment, an elapsed time of erasing to the single segment, and a ratio of valid pages in the single segment, wherein the determining of the number of SSD groups comprises determining a number n of SSD groups in the SSD system using Expression 1:

$$\frac{t_{C_{SEG}}}{t_{W_{SEG}}} \cdot \frac{1}{1-u} + \left(\frac{t_{R_{SEG}}}{t_{W_{SEG}}} + 1\right) \cdot \frac{u}{1-u} + 1 \leq n, \quad \text{[Expression 1]}$$

in which $t_{W_{SEG}}$ denotes the elapsed time of writing to the single segment, $t_{R_{SEG}}$ denotes the elapsed time of reading to the single segment, $t_{C_{SEG}}$ denotes the elapsed time of erasing to the single segment, and u denotes the ratio of the valid pages in the single segment.

6. The method of claim 5, wherein the executing of the write command comprises executing the write command using segments that are sequentially arranged in the plurality of SSDs.

7. The method of claim 5, further comprising:
when writing to a last segment in the first SSD group is completed, moving a writing pointer to the second SSD group to execute the write command.

* * * * *